Figure 1:
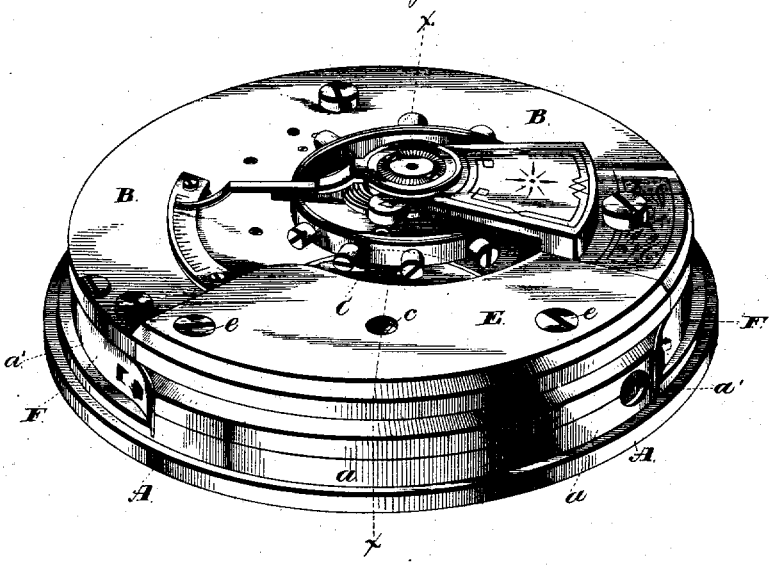

2 Sheets—Sheet 1.

G. HUNTER.

Assignor to the ELGIN NATIONAL WATCH COMPANY.

WATCH MOVEMENT.

No. 11,014. Reissued July 23, 1889.

Witnesses
Chas. J. Williamson
Henry C. Hazard

Inventor
George Hunter, by
Arnoldus Russell his Atty

N. PETERS, Photo-Lithographer, Washington, D. C.

2 Sheets—Sheet 2.

G. HUNTER.

Assignor to the ELGIN NATIONAL WATCH COMPANY.

WATCH MOVEMENT.

No. 11,014. Reissued July 23, 1889.

Witnesses
Chas. J. Williamson.
Henry C. Hazard.

Inventor
George Hunter, by
Crindle & Russell, his Attys.

N. PETERS, Photo-Lithographer, Washington, D. C.

UNITED STATES PATENT OFFICE.

GEORGE HUNTER, OF ELGIN, ASSIGNOR TO THE ELGIN NATIONAL WATCH COMPANY, OF CHICAGO, ILLINOIS.

WATCH-MOVEMENT.

SPECIFICATION forming part of Reissued Letters Patent No. 11,014, dated July 23, 1889.

Original No. 347,272, dated August 10, 1886. Application for reissue filed May 31, 1889. Serial No. 312,760½.

*To all whom it may concern:*

Be it known that I, GEORGE HUNTER, of Elgin, in the county of Kane, and in the State of Illinois, did invent certain new and useful Improvements in Watch-Movements, for which Letters Patent of the United States, No. 347,272, were issued upon the 10th day of August, 1886, which Letters Patent have proved defective, in that they do not fully cover the invention which was shown in the drawings and described in the specification that were filed in the Patent Office upon the 4th day of March, 1886: Now, therefore, being desirous of reissuing the said Letters Patent, I have prepared and do hereby declare that the following is a full, clear, and exact description of the said invention, reference being had to the accompanying drawings, in which—

Figure 2:
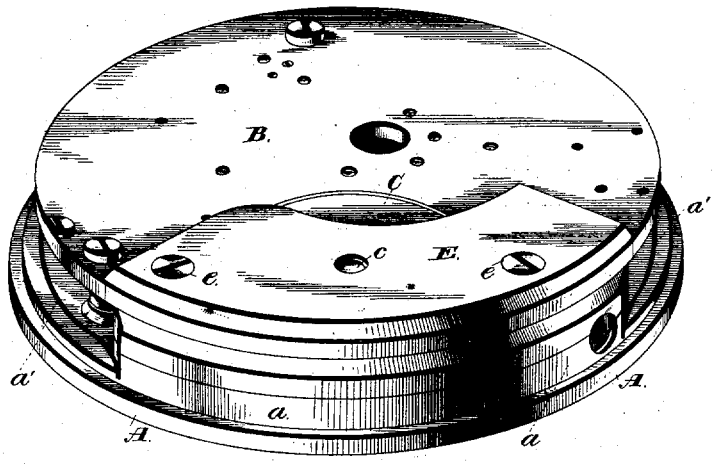
Figure 3:
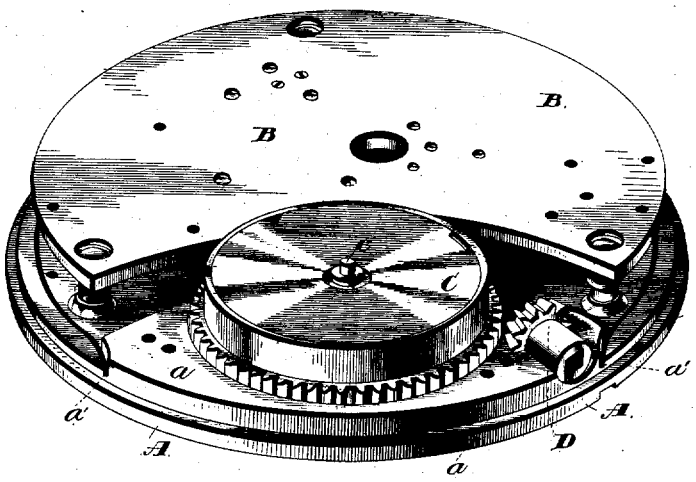
Figure 4:
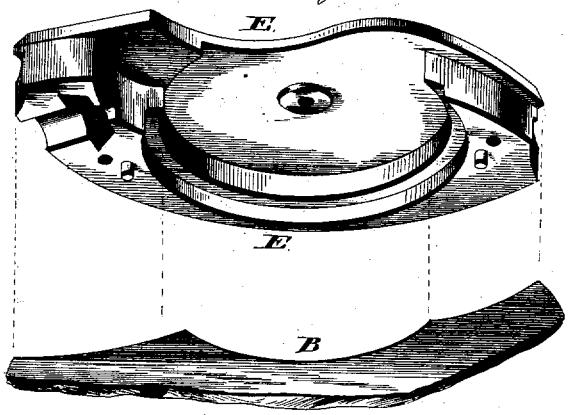
Figure 5:
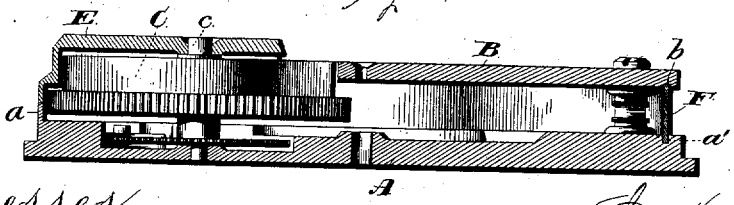

Figure 1 is a perspective view from the rear side of a watch-movement containing my improvements. Fig. 2 is a like view of the same with the dust bands or strips removed. Fig. 3 is a perspective of the movement-plates and barrel with the barrel-bridge removed. Fig. 4 is a like view from the inner sides of said bridge and the adjacent portion of the bottom plate; and Fig. 5 is a section upon line *x x* of Fig. 1.

Letters of like name and kind refer to like parts in each of the figures.

In the construction of full-plate watch-movements it has heretofore been customary to extend the top plate over the barrel and journal one end of the barrel-arbor in the same, or to employ for such barrel-arbor a bridge which was constructed separately and afterward attached to the top plate by screws; but both of such constructions have proved objectionable, the first-named because it was necessary to remove the entire top plate in order to take out the barrel, while the last-named construction was lacking in strength and durability.

The design of my invention is to remove the objections hereinbefore named; and to this end said invention consists, principally, in a full-plate watch-movement in which the barrel-bridge extends to and is secured directly upon the bottom plate, substantially as and for the purpose hereinafter specified.

It consists, further, in a full-plate watch-movement in which the barrel-bridge is secured to and supported entirely by the bottom plate, substantially as and for the purpose hereinafter shown.

It consists, further, in a full-plate watch-movement in which the barrel-arbor is in part journaled within a bridge that is disconnected from and independent of the top plate, substantially as and for the purpose hereinafter set forth.

It consists, further, in a full-plate watch-movement in which the barrel-arbor and winding-pinion are in part journaled within a bridge that is secured directly to the bottom plate, substantially as and for the purpose hereinafter shown and described.

It consists, further, in a full-plate watch-movement in which the barrel-arbor and winding-pinion are journaled within and between the bottom plate and a bridge that is entirely independent of the top plate, substantially as and for the purpose hereinafter specified.

It consists, finally, in the combination of the bottom plate, the top plate, the barrel-bridge, and the dust-bands, substantially as and for the purpose hereinafter shown.

In the carrying of my invention into practice I employ a watch-movement frame which is composed of a bottom plate A and top plate B, that are connected together and held in relative positions in the usual manner. About one-third of the top-plate B is removed at the points where the barrel C and the winding-pinion D are located, and for a corresponding area the inner face of the bottom plate A is raised, so as to give to the latter at such point about one-fourth greater thickness than is had by the remainder of said plate.

Fitting into and substantially filling the space left by the removal of a part of the top plate B is a bridge E, which extends to and fits upon the raised part *a* of the plate A, and is secured thereon by means of two screws *e*. Said bridge incloses the barrel C and furnishes a bearing for one end of its arbor *c*. It also incloses the winding-pinion D, and, in connection with said raised part, furnishes a bearing for the same. The outer side of said bridge has its ends preferably extended slightly over the adjacent portions of said top plate, but such projections may, if desired, be omitted.

As the bridge is secured directly to the bottom plate, it will be seen that it possesses a maximum of solidity and strength, and that it is impracticable for either of the parts journaled within or between said bridge and plate to get out of place, as is often done in movements of usual construction. In addition to such advantages in the construction shown, said barrel-bridge is entirely independent of the top plate and enables the barrel to be removed and replaced without disturbance of any other portion of the train. By causing the one bridge to journal both the barrel-arbor and winding-pinion the use of one bridge with its screws is avoided and a much better bearing is secured for said pinion than would otherwise be practicable.

The inner face of each of the plates A and B is provided near its edge with a narrow groove *a'* and *b*, respectively, which terminates at each end of the bridge E in an outward curve, and into such grooves are slipped two thin strips of metal F, that meet or overlap each other at the opposite side of the movement, and operate to effectually close the opening between the edges of said plates, so as to exclude dust from the train.

In the use of the term "full-plate movement" I wish to be understood as meaning a movement in which the train and escapement are covered by a top plate and the barrel is covered wholly or in part by a barrel-bridge, while the balance-wheel has its upper pivot journaled within a bridge or cock that is supported upon and attached to said top plate, and through an opening in the latter engages with said escapement.

Having thus described my invention, what I claim is—

1. A full-plate watch-movement in which the barrel-bridge extends to and is secured directly upon the bottom plate, substantially as and for the purpose specified.

2. A full-plate watch-movement in which the barrel-bridge is secured to and supported entirely by the bottom plate, substantially as and for the purpose shown.

3. A full-plate watch-movement in which the barrel-arbor is in part journaled within a bridge that is disconnected from and independent of the top plate, substantially as and for the purpose set forth.

4. A full-plate watch-movement in which the barrel-arbor and winding-pinion are in part journaled within a bridge that is secured directly to the bottom plate, substantially as and for the purpose shown and described.

5. A full-plate watch-movement in which the barrel-arbor and winding-pinion are journaled within and between the bottom plate and a bridge that is entirely independent of the top plate, substantially as and for the purpose specified.

6. The combination of the bottom plate, the top plate, the barrel-bridge, and the dust-bands, substantially as and for the purpose shown.

In testimony whereof I hereunto set my hand this 6th day of May, A. D. 1889.

GEORGE HUNTER.

Witnesses:
W. H. CLOUDMAN,
W. P. HEMMENS.